United States Patent [19]
Clatanoff et al.

[11] Patent Number: 6,052,491
[45] Date of Patent: Apr. 18, 2000

[54] NON-MONOTONIC CONTOUR DIFFUSION AND ALGORITHM

[75] Inventors: Todd A. Clatanoff, Allen; Stephen W. Marshall, Richardson; Vishal Markandey, Dallas, all of Tex.

[73] Assignee: Texas Instruments Incorporated, Dallas, Tex.

[21] Appl. No.: 08/788,141

[22] Filed: Jan. 24, 1997

[51] Int. Cl.⁷ .................................................. G06K 9/40
[52] U.S. Cl. ................................................... 382/275
[58] Field of Search .................... 382/269, 275, 382/274, 169; 358/455, 461; 348/252, 254, 771

[56] References Cited

U.S. PATENT DOCUMENTS

| | | | |
|---|---|---|---|
| 4,701,811 | 10/1987 | Moriguchi et al. | 358/298 |
| 5,121,223 | 6/1992 | Roe | 358/455 |
| 5,123,059 | 6/1992 | Hirosawa et al. | 382/50 |
| 5,134,685 | 7/1992 | Rosenbluth | 395/21 |
| 5,142,632 | 8/1992 | Tychon et al. | 395/375 |
| 5,386,304 | 1/1995 | Suzuki | 358/455 |
| 5,528,704 | 6/1996 | Parker et al. | 382/269 |
| 5,606,631 | 2/1997 | Weiss et al. | 382/275 |
| 5,726,718 | 3/1998 | Doherty et al. | 348/771 |

FOREIGN PATENT DOCUMENTS

| | | | |
|---|---|---|---|
| 0 656 616 | 6/1995 | European Pat. Off. | G09G 5/18 |
| 5-314266A | 11/1993 | Japan | G06F 15/72 |
| 08046785 | 2/1996 | Japan | H04N 1/403 |
| 2 155 723 | 9/1985 | United Kingdom | H04N 5/91 |
| WO 92/05537 | 4/1992 | WIPO | G09G 5/04 |
| WO 92/09064 | 5/1997 | WIPO | G09G 3/34 |

*Primary Examiner*—Yon J. Couso
*Attorney, Agent, or Firm*—Charles A. Brill; Wade James Brady III; Frederick J. Telecky, Jr.

[57] ABSTRACT

A method and device for producing an accurate approximation of a digital input word translated by a monotonic transfer function. The digital word is translated into a non-monotonic output word comprised of a closest-approximation component and an error component. The error component is zero for regions in which each consecutive input word produces a unique closest-approximation component. In regions in which each consecutive input word produces the same closest-approximation component the error signal represents the number of consecutive input words which produce the same closest-approximation component, and the position within that run of consecutive input words occupied by the present input word.

15 Claims, 7 Drawing Sheets

NON-MONOTONIC CONTOUR DIFFUSION AND ALGORITHM

FIELD OF THE INVENTION

This invention relates to the field of image display systems, more particularly to methods and systems for reducing artifacts caused by quantization errors in digital display systems.

BACKGROUND OF THE INVENTION

Display systems create visual images from an electrical input image signal. Digital display systems, which use a quantized image signal, have many advantages when compared to the typical analog display system, including increased image rendition accuracy and the prospect of low-cost high-definition television implementation. However, without proper consideration for representation of the image's dynamic range, a digital system can induce new artifacts. Digital display systems can only display a finite number of intensity levels because the image data is quantized. Displaying an image using only a finite number intensity levels can detract from the overall image quality, causing visual artifacts such as false contouring or color shifting.

False contouring occurs when the quantization of an image signal causes contours to appear in an output image that do not exist in the input image. For example, the image of a smooth ball has a gradual color or intensity gradient. When the analog input is quantized, the smooth image gradient may be transformed into several large blocks of adjacent pixels, wherein each pixel in a block is assigned an identical image signal value. If these large blocks of adjacent pixels are not separated by a region of non-homogenous pixels, the blocks will cause a "stair-step" effect and the smooth curve of the original image will appear to be a series of single-color flat surfaces.

Color shifting is a similar problem that occurs when the jumps in quantization levels do not occur at the same signal level for each color. For example, if the quantization levels are set so that the green component turns on first, followed by the red and blue components, a gray pixel will turn green, then yellow, before finally turning the desired gray. While color shifting is most evident when a pixel is initially turned on as in the example above, higher intensity pixels may have perceptible changes in color as the three color signals individually increment.

False contouring and color shifting artifacts may be increased by either quantizing or digital processing processes including MPEG encoding or decoding, and de-gamma processing. A solution to the false contouring and color shifting problem is needed that does not significantly increase the display system cost.

SUMMARY OF THE INVENTION

The present invention provides an improved method and apparatus for converting an input signal to an output signal representing the input signal. According to one embodiment of the present invention, a signal translation circuit is provided for converting an input signal into a digital output signal according to a translation junction. The signal translation circuit is comprised of a first translation block for converting the input signal into a digital approximation representing the input signal. A second translation block accumulates an error signal representing the difference between the input signal and the digital approximation thereof. An adder receives the digital approximation from the first translation block and the error signal from the second translation block, and outputs an improved approximation signal representing the digital approximation and the error signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A solution to the false contouring and color shifting problems, which does not require increasing the resolution of the display system, involves using a lookup table, or algorithm, to translate an input word into an output word, wherein the translation performed by the lookup table is non-monotonic. A lookup table is typically an m×n memory array that uses an in-bit data word to produce an n-bit output word. In addition to reducing the false contouring of an image signal, some embodiments use the same lookup table to translate or scale the data.

Figure 1:
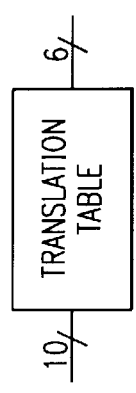
FIG. 1 is a block diagram of a simple signal translation table.

An example of a simple data translation scheme of the prior art is shown in FIG. 1. In FIG. 1. a 10-bit input word is simply truncated to produce a 6-bit output word. The truncation operation scales the 10-bit input word to a 6-bit output word by dropping the least significant four bits of data. When a binary data word is truncated, the output word has ½ⁿ times the resolution of the input word, where n equals the number of bits lost in translation. Therefore, in FIG. 1 the output word has one-sixteenth the resolution of the input word.

The data translation scheme shown in FIG. 1 clearly illustrates how false contouring can be created. If an image is displayed on an analog display system, and the image represents a brightness gradient from a minimum brightness level on the left edge to a maximum brightness level on the right edge, there will be a constant and gradual increase in the brightness from the left edge to the right edge. If the same image is displayed on a 10-bit digital image system, there will be 1024 discrete brightness levels from the left edge to the right edge. The steps between the 1024 levels will probably be too small for a viewer to notice, and the 10-bit image will appear the to be same as the analog image. However, if the 10-bit signal is truncated to only 6 bits, the image is comprised of 64 levels and the viewer may interpret the image, which is intended to represent a smooth increase, as a series of stair-steps, each having a noticeably increased brightness. Each of these small, but sharp, increases appears to create a feature, or false contour, that is not part of the original image.

Figure 2:
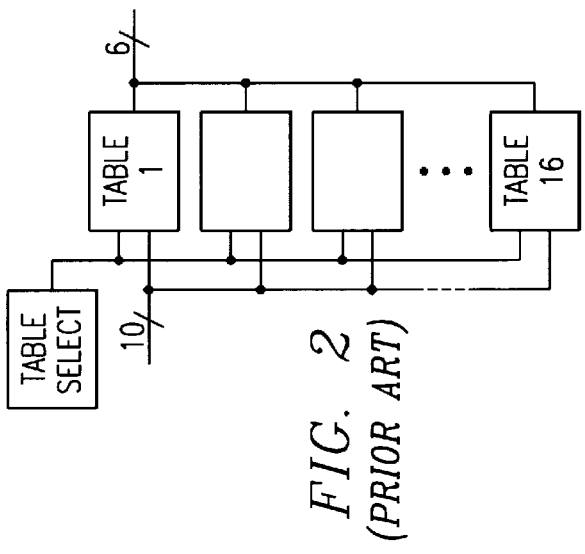
FIG. 2 is a block diagram of a signal translation device of the prior art.

One method used in the prior art to avoid false contours is shown in FIG. 2. This method is taught by U.S. Pat. No. 5,123,059 which was issued on Jun. 16, 1992 to Hirosawa et al., involves the use of multiple data translation tables, or look-up tables. Each table is used in turn to convert an input data word to an output data word. The tables contain different data in each case where an input word that does not correspond exactly to an output word. The data is chosen so that the average of all of the output words is a more accurate approximation of the desired output word than it is possible for a single table to generate. When the tables are used as part of an image display system, the viewer's eye performs the integration and the pixel produced by the 6-bit output words appears to have 10 bits of resolution. For example, Table 1 lists the 16 6-bit data output words stored in each of 16 lookup tables for two 10-bit binary input data words. In each case, the average of the 6-bit output words exactly represents the original 10-bit input word.

| Table Number: | Output Word for Input of: | |
| --- | --- | --- |
| | 00,0000,0110 | 11,1010,1011 |
| Table 1 | 00,0000 | 11,1011 |
| Table 2 | 00,0000 | 11,1011 |
| Table 3 | 00,0001 | 11,1011 |
| Table 4 | 00,0000 | 11,1010 |
| Table 5 | 00,0000 | 11,1011 |
| Table 6 | 00,0001 | 11,1011 |
| Table 7 | 00,0000 | 11,1011 |
| Table 8 | 00,0000 | 11,1010 |
| Table 9 | 00,0001 | 11,1011 |
| Table 10 | 00,0000 | 11,1011 |
| Table 11 | 00,0000 | 11,1011 |
| Table 12 | 00,0001 | 11,1010 |
| Table 13 | 00,0000 | 11,1011 |
| Table 14 | 00,0000 | 11,1011 |
| Table 15 | 00,0001 | 11,1011 |
| Table 16 | 00,0000 | 11,1010 |

Data truncation, with its obvious reduction in image resolution, may be used to reduce the throughput requirements of an image display system, but has limited use for other purposes. A more common situation in which false contours are created occurs when data is translated by the use of some transfer function without a sufficient increase in the number of data bits used to represent the translated data word. Virtually all data translations result in multiple input data words being mapped into a single output word when the number of output bits is the same or less than the number of input bits. The loss of information, when it occurs to image data, can create false image contours in displayed images.

One application where data translation can create false image contours occurs when a non-CRT based display system processes a brightness component of an input image signal which has been generated for display on a CRT-based display system. This form of compensation is called gamma correction or gamma compensation, or degamma correction or degamma correction. When a digital display system performs gamma correction, false contours may be generated, especially in low-brightness portions of an image, when multiple input words are mapped into a single output word.

Figure 3:
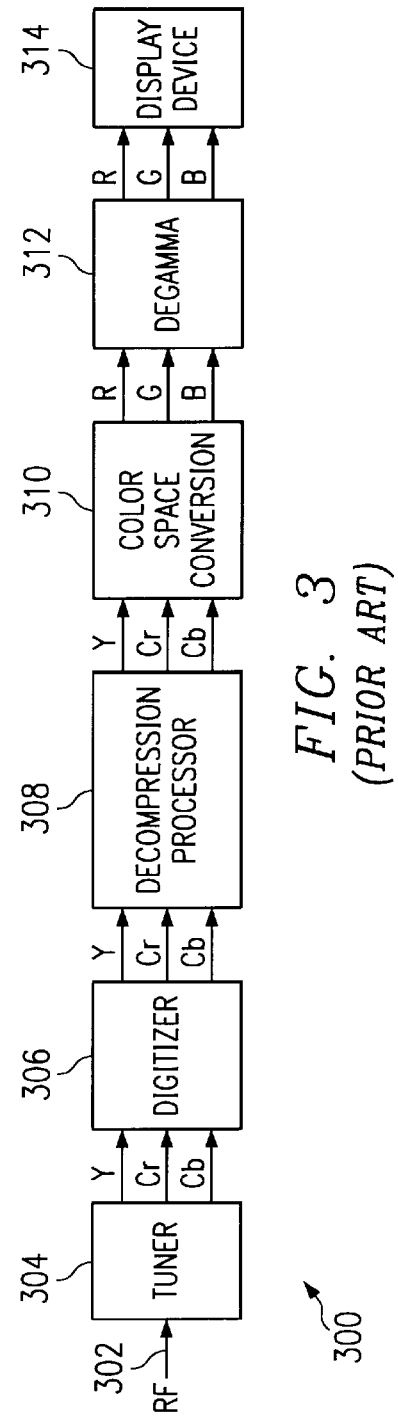
FIG. 3 is a block diagram of a display system of the prior art including a degamma circuit.

FIG. 3 is a block diagram of a portion of a digital display system 300 of the prior art. In FIG. 3, a radio frequency (RF) television broadcast signal 302 is received by tuner 304. Tuner 304 down-converts the television broadcast signal 302 and separates the down-converted signal into luminance (Y) and chrominance components (Cr, Cb). The digital display system 300 shown could easily be modified to receive a baseband signal or component image signal depending on the desired image source.

After the television broadcast signal has been down-converted and separated, the image signal components are digitized by one or more analog-to-digital converters in digitizer 306. If necessary, the digital image signal is decoded or decompressed by optional decompression processor 308, which extracts image data from an encoded image signal. For example, the television broadcast signal 302 may be compressed using an industry standard MPEG or Px64 compression scheme, or any other encoding or compression scheme. A color space converter 310 converts the luminance (Y) and chrominance (C) portions of the decoded digital data into a red (R), green (G), and blue (B) component image signal (RGB). The RGB data is ready to be displayed on a cathode ray tube (CRT) or similar display device 314.

Figure 4:
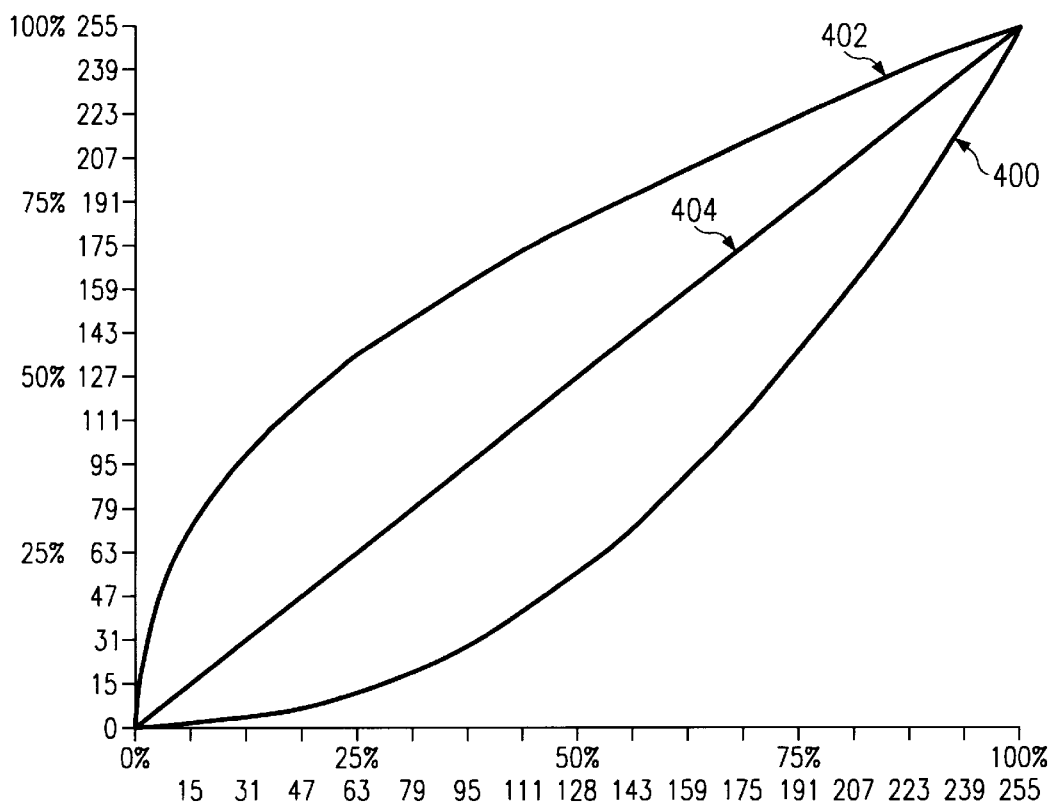
FIG. 4 is a plot of the gamma and degamma translations functions as well as a linear translation function.

Broadcast television signals are gamma corrected to compensate for the non-linear display transfer function of a CRT. FIG. 4 shows the display response function of a CRT display 400, a television broadcast signal 402, and a linear display device 404. In FIG. 4, the input signal magnitude is on the horizontal axis and the output signal magnitude is on the vertical axis. Each axis is labeled as a percentage of full scale and also as the decimal equivalent of an 8-bit binary number with 255 representing full scale. The CRT response function 400 is approximately equal to $Y=X^{1/2.2}$. Television broadcast systems multiply a linear input signal by the television broadcast signal response function 402 so that when the signal is displayed by a display device 314 (as shown in FIG. 3), which has a CRT display response function 400, the recreated image will represent the input image accurately.

If the image signal is to be displayed on a display device 314 that has a linear luminance transfer function, the image signal must be processed to remove the gamma compensation. Ideally, the degamma compensation is performed prior to digitizing the image signal. However, an accurate analog degamma converter may increase the cost and complexity of the system. Furthermore, while the degamma processing is performed on RGB data, progressive scan conversion and other video processing are performed using digital data in luminance/chrominance format. Therefore, to minimize the system cost, the luminance/chrominance image data is digitized and a digital degamma circuit 312, as shown in FIG. 1 is used to remove the gamma compensation from the digitized image signal after the conversion to RGB format. Degamma circuit 312 often is merely a lookup table for converting a digital input word to a degamma output word.

The degamma circuit 312 introduces quantization errors into the signal path. Quantization errors also are introduced by the digitizer circuit 306, the decompression processor 308, and to a lesser extent by the color space conversion function 360. Degamma quantization errors are especially noticeable when they occur with signals which have a low brightness level because the CRT display response function 400 causes a large number of the input codes to translate to the same output code, and also because when the output code is finally incremented, in response to a gradually increasing input signal, it represents a large percentage increase in the output signal.

Figure 5:
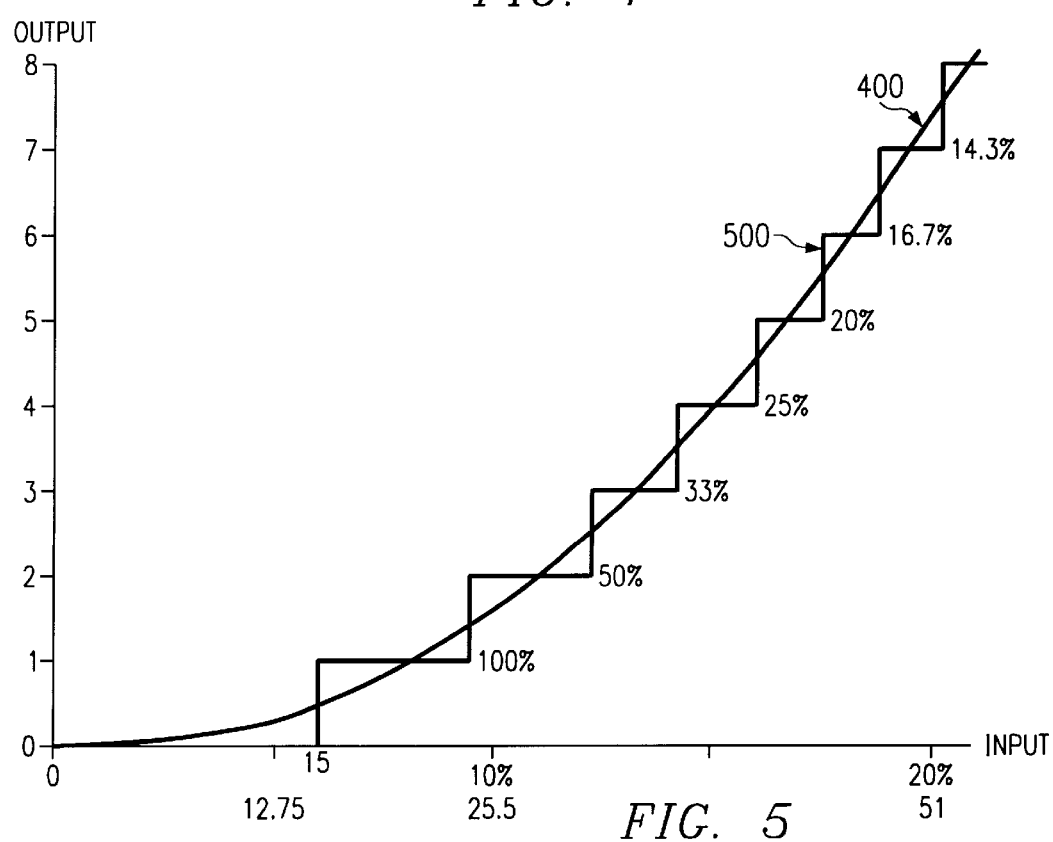
FIG. 5 is a plot of a portion of a degamma translation function and its binary approximation.

For example, if an input signal represents an image having a low brightness level, the broadcast signal response function 402 will convert a small increase in the input signal into a large increase in the output signal. For an input signal representing an image with a high brightness level, the broadcast response function 402 will convert the same small increase in the input signal into a smaller increase in the output signal. To correct for the broadcast signal compensation, the digital degamma response function 500, a portion of which is shown in FIG. 5, must convert many input codes into the same output code. The degamma response function 500 of FIG. 5 converts decimal outputs 0 through 14 to output code 0, input codes 15 through 25 to output code 1, and input codes 25 through 31 to output code 2. As mentioned above, this translation not only introduces quantization errors, but also results in large percentage jumps in magnitude as shown in FIG. 5.

The ideal solution to the problem of reducing quantization errors and the resulting false-contouring or color shifting artifacts is to increase the resolution of the output image until the quantization levels are so small that the false-contouring and color shifting that does occur is beneath the perceptual threshold of the human viewer. However, increasing the resolution of the digital image signal requires a proportional increase in processing throughput and memory, both of which increase the cost of the display system. Additionally, spatial light modulators which sequentially display each bit of image data, such as the digital micromirror device, may not have a fast enough response time to display the lower order bits of a high resolution signal.

Several solution have been invented to combat the problem of false contouring caused by quantization errors. These solutions include temporal dithering of the translation function and error diffusion. Temporal dithering involves changing, usually by a random process, the translation function that processes the data. An example of temporal dithering was given above where 16 6-bit lookup tables were used to truncate a 10-bit word.

Error diffusion is a scheme that reduces the quantization errors without significantly increasing the cost of the display system. Error diffusion as taught by commonly assigned U.S. Pat. No. 5,623,281, issued Apr. 22, 1997 and entitled "Error Diffusion Filter for DMD Display," and U.S. Pat. No. 5,726,718, issued Mar. 10, 1998 and entitled "Error Diffusion Filter for DMD Display", can be used to allow a digital data word to be truncated without completely losing the information from the lease significant bits that are truncated. One example of the application of error diffusion to a digital display system is shown in FIG. 6.

Figure 6:
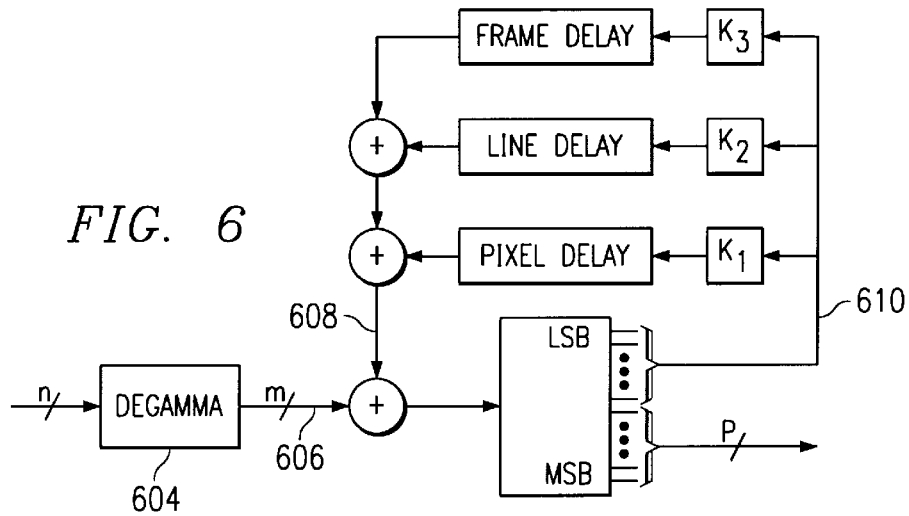
FIG. 6 is a block diagram of a digital display degamma circuit including an error diffusion circuit of the prior art.

In FIG. 6. an n-bit data word is input into a degamma circuit 604. The degamma circuit 604 outputs an m-bit output word 606, where m is greater than n, representing the gamma corrected data. The m-bit output word 606 is added to a cumulative error signal 608 and the least significant bits are truncated while the most significant p-bits are output to the next circuit block. Typically p is equal to n so that the output word has the same resolution as the input word.

The truncated bits, which represents a round-off error 610, are used to generate a cumulative error signal for later data words. The cumulative error signal is generated by applying a portion of the round-off error to several nearby pixels so that the average of the pixels more closely approximates the original m-bit data words. For example, FIG. 6 shows dividing the round-off error 610 into three portions and adding a first portion to the next pixel on the same line, a second portion to the same pixel on the next line, and a third portion to the same pixel in the next frame. The three weighting factors, $K_1$, $K_2$, and $K_3$, determine what portion of the current round-off error is applied to each of the nearby pixels. Typically the sum of the three weighting factors is one. One drawback to the prior art compensation schemes is that they all require additional hardware, additional processing powers or both.

The solution to the problem of false contouring taught herein is apparently the first solution to take advantage of the fact that the false contours typically occur, and are at their worst, when a gradually changing image is being displayed and there are many input words that are mapped to the same output word.

According to one embodiment of a degamma lookup table taught herein, the translation function represented by the lookup table is modified such that some of the translations in the otherwise flat regions of the translation function generate non-monotonic steps in the output values. In effect the output values for a set of input values of nearly equal magnitude are dithered such that the average output of the translation function more accurately represents the desired non-quantized translation function.

Figure 7:
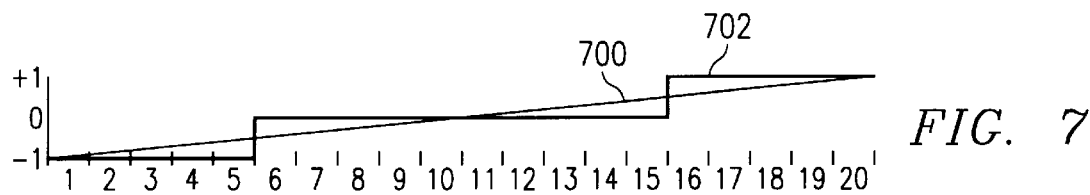
FIG. 7 is a waveform showing a monotonic input signal and a best approximation digital version of the input signal.
Figure 8:
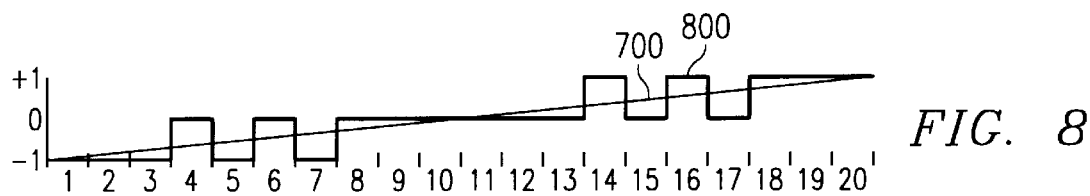
FIG. 8 is a waveform showing a monotonic input signal and a non-monotonic digital approximation of the input signal according to one embodiment of the disclosed invention.

An example of this operation is shown in FIGS. 7 and 8. In FIG. 7, a 20-pixel segment of a gradually increasing analog signal 700 is translated to a digital signal 702. In FIG. 7, the analog input signal 700 is only mapped into three unique output signals over the entire 20-pixel segment. FIG. 8 shows the same analog signal 700 superimposed on a portion of a non-monotonic translation output signal 800. Although words 4, 7, 14, and 17 do not approximate the input signal as closely as possible, the average value of several adjacent words more closely represents the input signal 800 than the original output signal 700 in FIG. 7.

Several algorithms may be used to generate a non-monotonic translation function. A very simple method is to merely exchange the values of a single bit before a transition with a single word after the transition. This exchange was shown in FIG. 8, where words 4 and 7 were exchanged and words 14 and 17 were exchanged. This exchange softens the abrupt transition between adjacent flat spots.

An alternative algorithm generates a translation value for a pixel by summing the value of a group of transformed pixels from N to M and comparing the total with the sum of the desired output function over the range N to M+1. Pixel M+1 is assigned a value equal to the difference between the desired function and the transformed function.

Figure 9:
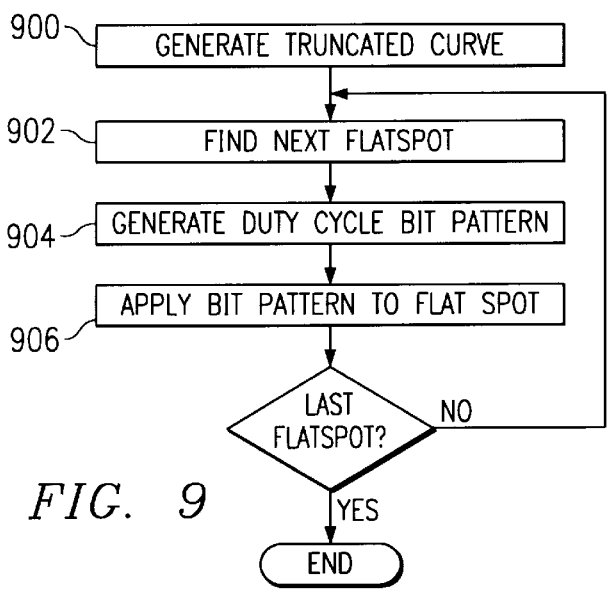
FIG. 9 is a block diagram of a signal translation function according to one embodiment of the present invention.

Still another alternative, which very closely approximates the desired transfer function, is represented by the flowchart of FIG. 9. According to the embodiment representing by FIG. 9, a non-monotonic transfer function is created by first generating an approximation of the desired transfer function as represented by block 900. According to one embodiment of the invention, this approximation is obtained by inputting each successive input data value into the desired transfer function and truncating the non-integer portion of the resulting output data word.

After the approximation of the desired transfer function is obtained, block 902 checks the output data words to detect which portions of the transfer function map multiple input words to a common output word. The portions, where a change in the input word does not result in a change in the output word, are known as straight-line segments or flat spots. The length of each flat spot is measured and is used to determine, in block 904, the bit pattern that is applied to the translation table. The bit pattern consists of a bit for each repeated code in a straight-line segment, and always starts with a 0.

The bit pattern is determined by calculating the accumulated error for each location of the flat spot, starting with the second repeated code which is the second location of the flat spot. The accumulated error for each repeated code is:

$$ACC_I = ACC_{I-1} + (I-1)/RPC$$

where:

RPC is the number of repeated codes in a straight-line segment, and

I is the location within the straight-line segment.

If the accumulated error for a location is greater than one, the correction bit for that location is a one, and a one is subtracted from the accumulated error. Otherwise, the correction bit for that location is a zero. The correction bits are added, in block 906 to the output words calculated by step 900.

Figure 13:
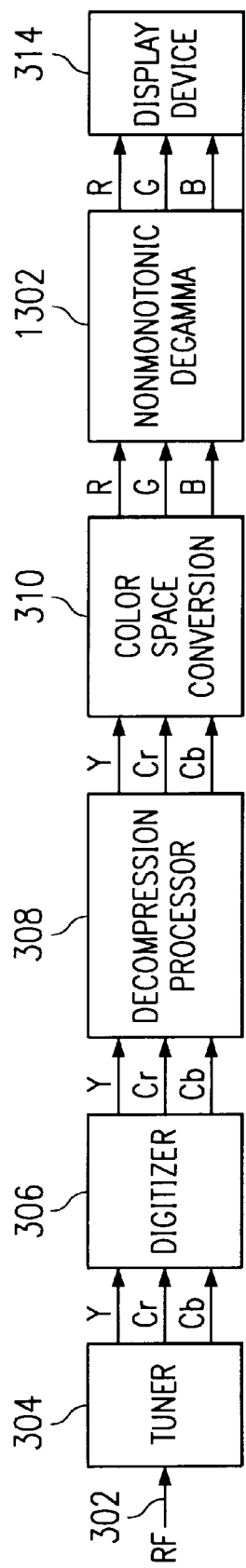
FIG. 13 is a block diagram of a display system including a nonmonotonic a degamma circuit.

The advantage of the disclosed method of translating an input word into an output word is that no additional hardware or processing power is required to perform the translation. According to one embodiment, the translation function is pre-calculated and is stored in a memory lookup table. The size of tile memory lookup table, which is required to perform the translation, is not increased in order to perform the contour diffusion taught herein. This saves the hardware associated with the error diffusion feedback loops or the temporal dithering lookup table schemes. FIG. 13 shows a display system 1300 using a nonmonotonic degamma compensation circuit 1302 according to the present invention.

Figure 14:
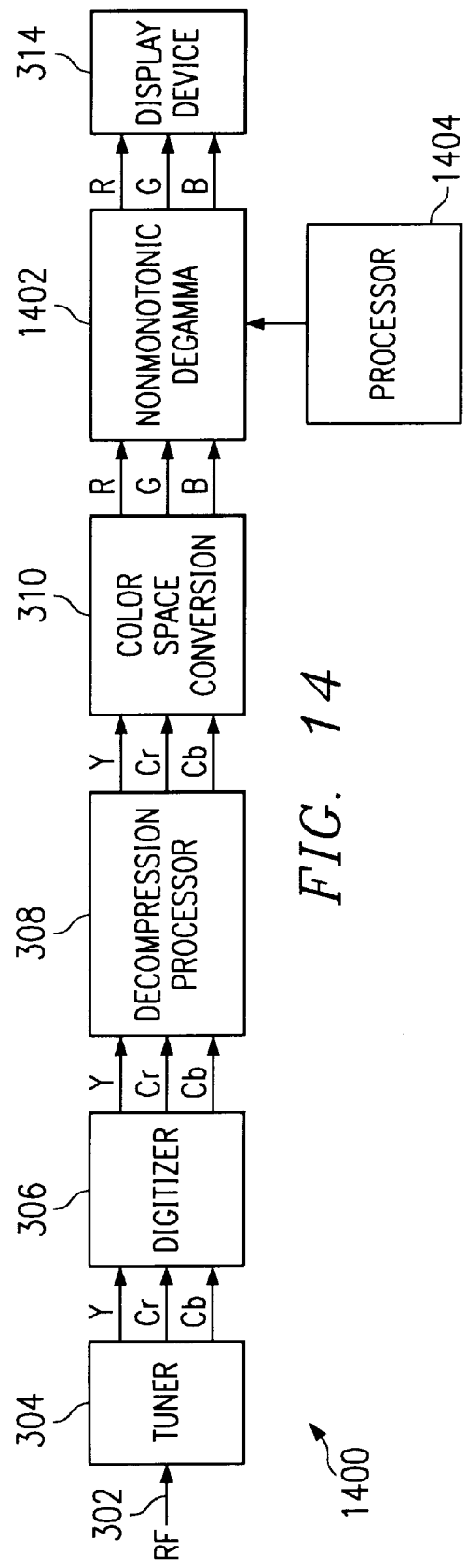
FIG. 14 is a block diagram of a display system including a nonmonotonic a degamma circuit and a processor for calculating and loading the degamma translation data.

Some systems dynamically alter the degamma translation function, usually to alter the brightness and contrast of an image. In these embodiments the modified degamma translation function is recalculated and stored in RAM by the display system. While this requires a small amount of processing throughput, in practice the tables are only occasionally recalculated and the excess load on processing power is minimal. FIG. 14 shows a display system 1400 which includes a nonmonotonic degamma compensation circuit 1402 according to the present invention and a processor 1404 to calculate and load the degamma data.

It is possible for systems using the described method of contour diffusion to generate artifacts due to the induced errors in the translation function. For example, a viewer may detect the non-monotonicity of the degamma translation. However, the artifact created by this method typically will be fainter than the artifacts the method seeks to eliminate. Additionally, the patterns induced in the output image will be disrupted if the brightness gradient of the input image doesn't align with the row or columns of the display.

Figure 10:
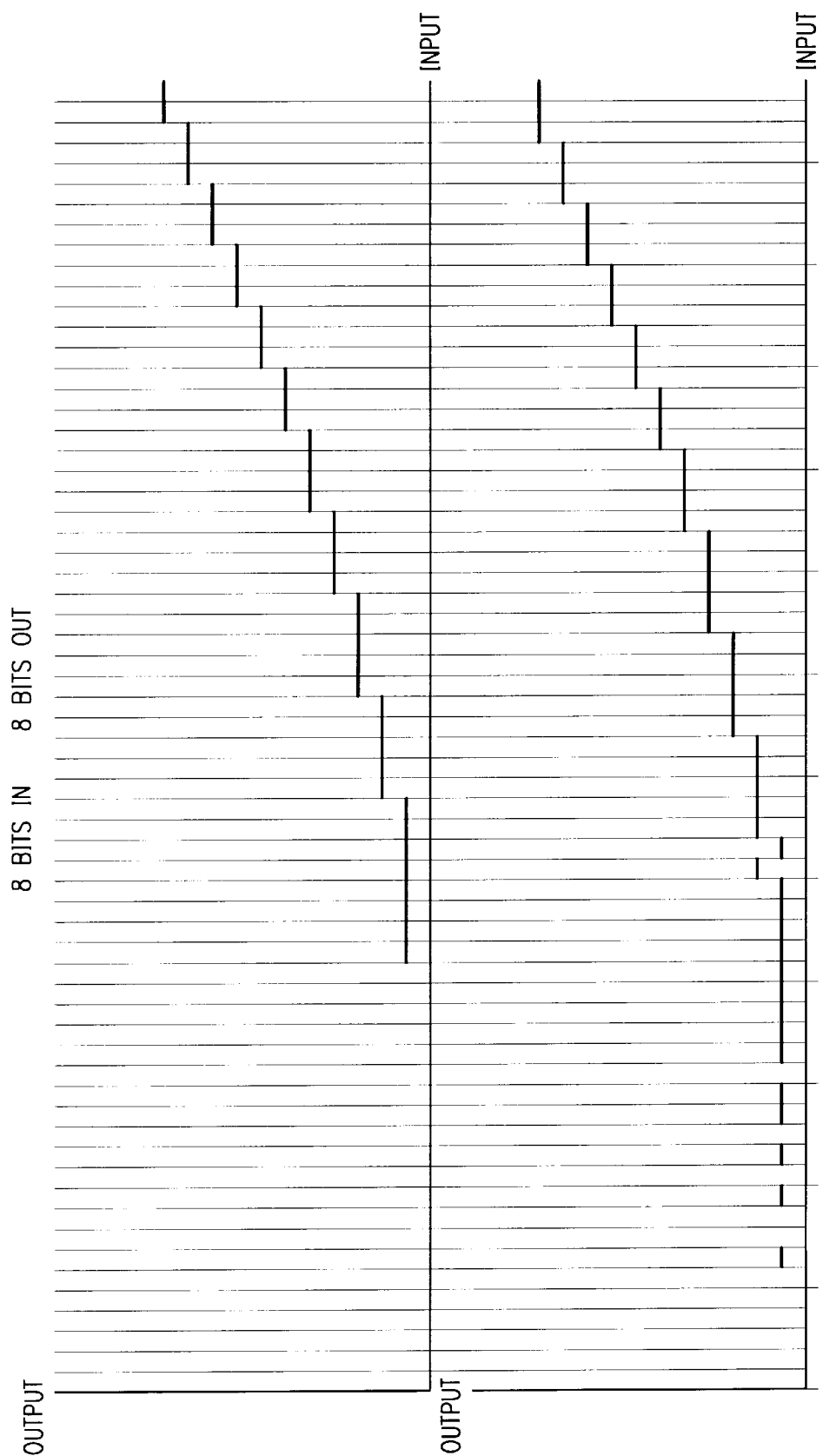
FIG. 10 is a plot of an input and output signal processed by the signal translation function of FIG. 9 over a first range of inputs.
Figure 11:
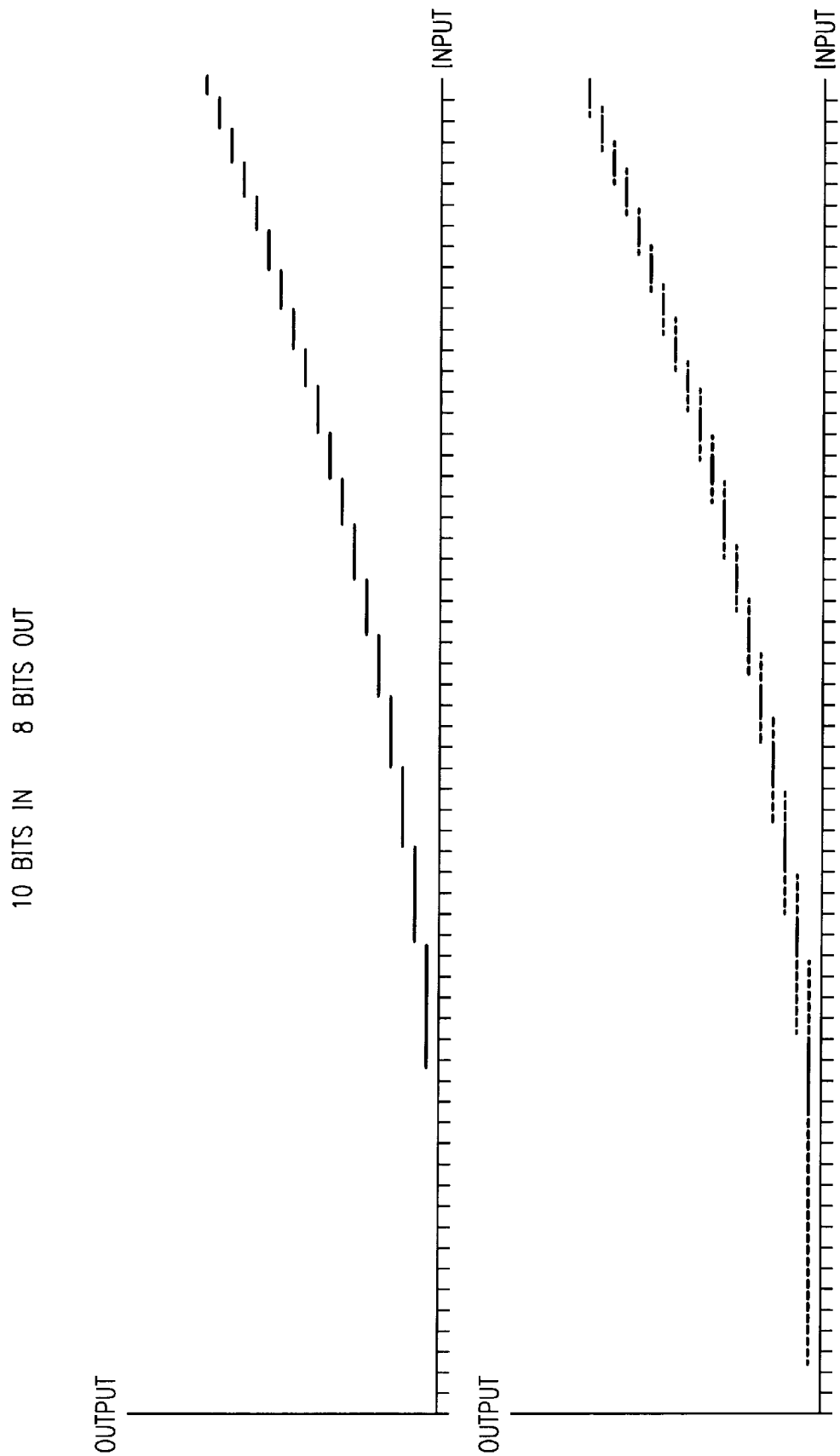
FIG. 11 is a plot of an input and output signal processed by the signal translation function of FIG. 9 over a first range of inputs.
Figure 12:
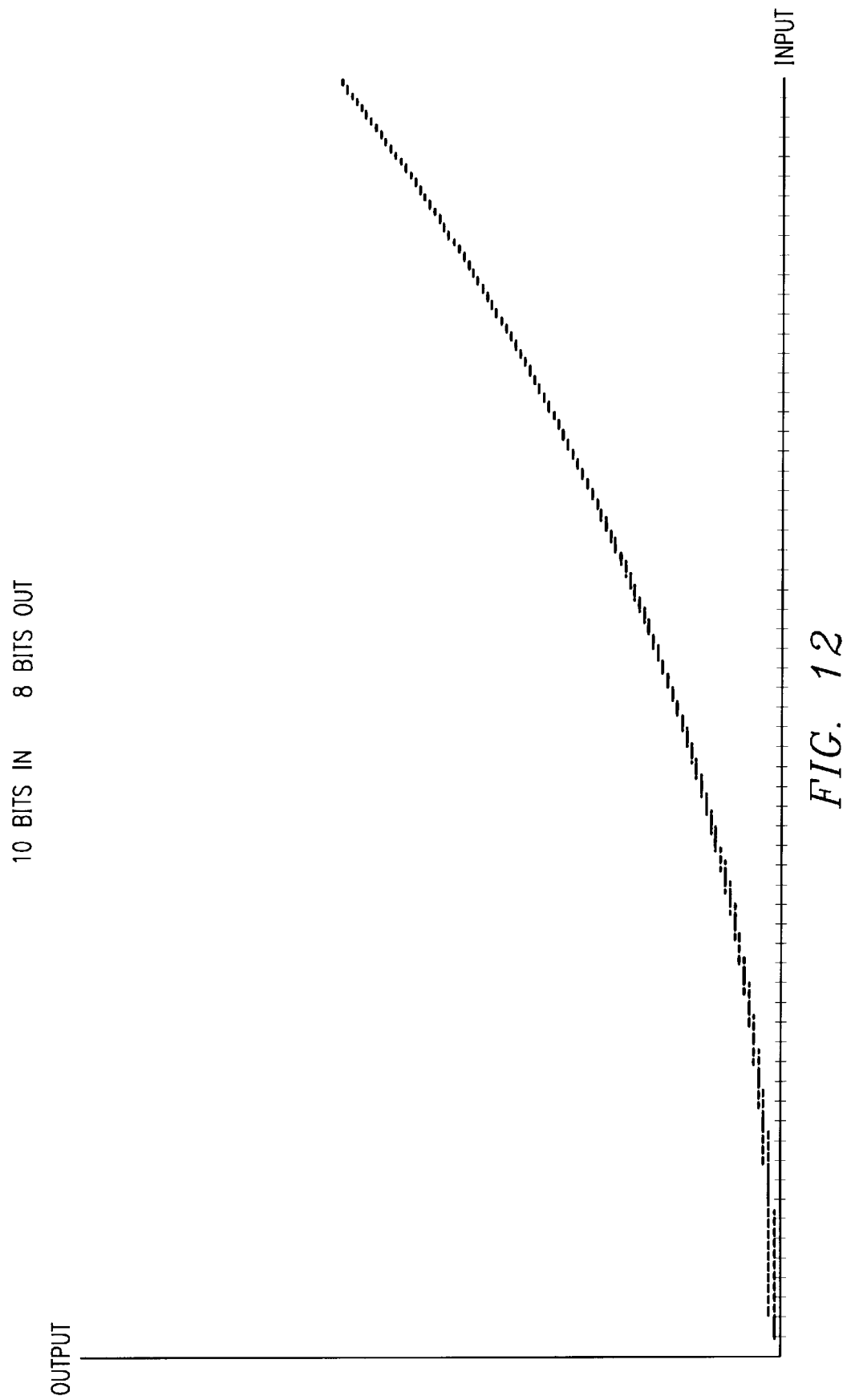
FIG. 12 is a plot of an output signal generated by the signal translation function of FIG. 9.

Tables 2 and 3 detail the generation of translation data for a degamma lookup table according to one embodiment of the disclosed invention. In Table 2, an 8-bit data input word is used to generate an 8-bit degamma curve. A portion of the standard degamma curve representing the first 64 input words is shown in the upper half of FIG. 10, and the corresponding portion of the degamma curve generated by Table 2 is shown in the lower half of FIG. 10. In Table 3, a 10-bit data input word is used to generate all 8-bit degamma curve. A portion of the standard degamma curve representing the first 320 input words is shown in the upper half of FIG. 11, and the corresponding portion of the degamma curve generated by Table 3 is shown in the lower half of FIG. 11. FIG. 12 shows a portion of the degamma curve generated by Table 3 that is 640 words long.

Thus, although there has been described to this point a particular embodiment for a method and structure of decreasing the artifacts generated by a signal translation through the use of a non-monotonic translation function, it is not intended that such specific references be considered as limitations upon the scope of this invention except in-so-far as set forth in the following claims. For example, although the previous description of a digital display system has discussed the signal flow with respect to FIG. 3, it is understood that various portions of the signal path may be reordered or altered without changing the overall effect of the system. Furthermore, having described the invention in connection with certain specific embodiments thereof, it is to be understood that further modifications may now suggest themselves to those skilled in the art, it is intended to cover all such modifications as fall within the scope of the appended claims.

```
'DUTY CYCLE MODULATION FOR ERROR DIFFUSION DE-GAMMA CURVE
'GENERATE TRUNCATED DE-GAMMA CURVE
'TRIES FOR 100% DUTY CYCLE AT LSB TRANSITIONS
'STRAIGHT LINE SEGMENTS IN BETWEEN FROM 0% TO 100% AT NEXT TRANSITION
SCREEN 9
DIM T (300), MT (300), DC (50)
'GENERATE TRUNCATED DE-GAMMA CURVE
G = 2.2
FOR I = 0 TO 255
T(I) – int (255 * (I ^ 2.2) / (255 ^ 2.2))
'PRINT I, T(I)
NEXT I
LINE (0, 300) – (640, 300), 10
LINE (0, 150) – (640, 150), 10
FOR I = 0 TO 640 STEP 10
```

-continued

```
LINE (I, 300) – (I, 0), 10
NEXT I
FOR I = 0 TO 640 STEP 50
LINE (I, 300) – (I, 305), 10
NEXT I
'START LOOP
J = C
RPC = 0
DO UNTIL T(I) > T(J)
RPC = RPC + 1
I = I + 1
LOOP
'PRINT J, RPC
'GENERATE BIT PATTERN FOR 0 TO 100% DUTY CYCLE DEPENDENT ON RPC
MT(J) = T(J)
FOR I = 0 TO RPC – 1
DC(I) = I/RPC
'PRINT I, DC(I)
NEXT I
ACC = 0
FOR I = 1 TO RPC – 1
ACC = ACC + I/RPC
IF ACC < 1 THEN MT (I + J) = T(J) ELSE MT (I + J) = T(J) + 1:ACC = ACC – 1
NEXT I
J = J + RPC
'LOOP UNTIL DONE
LOOP
FOR I = 0 TO 64
K = I * 10
LINE (K, 300 – MT(I) * 10) – (K + 10, 300 – MT(I) * 10), 10
LINE (K, 150 – T(I) * 10) – (K + 10, 150 – T(I) * 10), 10
'PRINT I, MT (I)
NEXT I
'DUTY CYCLE MODULATION FOR ERROR DIFFUSION DE GAMMA CURVE
'GENERATE TRUNCATED DE-GAMMA CURVE
'TRIES FOR 100% DUTY CYCLE AT LSB TRANSITIONS
'STRAIGHT LINE SEGMENTS IN BETWEEN FROM 0% TO 100% AT NEXT TRANSITION
SCREEN 9
DIM T(1200), MT(1200), DC(100)
'GENERATE TRUNCATED DE-GAMMA CURVE
G = 2.2
FOR I = 0 TO 1023
T(I) = INT(255 * (I ^ 2.2) / (1023 ^ 2.2))
'PRINT I, T(I)
NEXT I
LINE (0, 300) – (640, 300), 10
LINE (0, 150) – (640, 150), 10
FOR I = TO 640 STEP 2
'LINE (I, 300) – (I, 0), 10
NEXT I
FOR I = 0 TO 640 STEP 10
LINE (I, 300) – (I, 305), 10
NEXT I
'STARTLOOP
J = 0
DO UNTIL J > 320
'FIND NUMBER OF REPEATED CODES IN SEGMENT
I = J
RPC = 0
DO UNTIL T(I) > T(J)
RPC = RPC + 1
I = I + 1
LOOP
'PRINT J. RPC
'GENERATE BIT PATTERN FOR 0 TO 100% DUTY CYCLE DEPENDENT ON RPC
MT(J) = T(J)
FOR I = 0 TO RPC – 1
DC(I) = I/RPC
'PRINT I, DC(I)
NEXT I
ACC = 0
FOR I = 1 TO RPC – 1
ACC = ACC + I/RPC
IF ACC < 1 THEN MT (I + J) = T(J) ELSE MT (I + J) = T(J) + 1:ACC = ACC – 1
NEXT I
J = J + RPC
'LOOP UNTIL DONE
LOOP
FOR I = 0 TO 320
```

```
-continued

K = I * 2
LINE (K, 300 - MT(I) * 5) - (K + 1, 300 - MT(I) * 5), 10
LINE (K, 150 - T(I) * 5) - (K + 1, 150 - T(I) * 5), 10
'PRINT I, MT(I)
NEXT I
```

What is claimed is:

1. A method of converting a monotonic sequence of input words to a sequence of digital output words, said method comprising:

translating said sequence of consecutively valued input words to produce a range of output words, said translating step producing an output word for each input word, wherein said range of output words is a function of said sequence of consecutively valued input words;

locating regions in said sequence of output words in which consecutive input words translate to a common output word;

calculating the number of consecutive input words that translate to a common output word in each of said regions;

producing an error signal for each output word in said regions, said error signal representing the number of consecutive input words that translate to said output word and the relative location of each output word within said regions; and adding said error signals to said output word corresponding to said error signal.

2. The method of claim 1 wherein said error signal is one data bit for each output data word.

3. A method of converting a monotonic sequence of input words to a sequence of digital output words, said method comprising:

translating said sequence of consecutively valued input words to produce a range of output words, said translating step producing an output word for each input word, wherein said range of output words is a function of said sequence of consecutively valued input words;

locating regions in said sequence of output words in which consecutive input words translate to a common output word;

locating a transition point in said sequence of output words at which two of said regions abut; and exchanging an output word prior to said transition point with an output word following said transition point.

4. The method of claim 3, said exchanging step comprising:

exchanging a value of an output word immediately prior to said transition point with a value of an output word immediately following said transition point.

5. The method of claim 3, said exchanging step comprising:

exchanging a value of an output word two output words prior to said transition point with a value of an output word two output words following said transition point.

6. The method of claim 1, said producing step comprising:

producing an accumulated error signal for each input word in said regions, said accumulated error signal equal to:

$$ACC_I = ACC_{I-1} + (I-1)/RPC$$

where:

RPC is said number of consecutive input words that translate to a common output word in each of said regions; and I is a location of said output word in said region; and if said accumulated error signal is greater than one, said error signal is equal to one and one is subtracted from said accumulated error signal, if said accumulated error signal is not greater than one, said error signal is equal to zero.

7. The method of claim 1, said translating step comprising:

using a monotonic function to translate said sequence of consecutively valued input words to said range of output words.

8. A method of translating an input word to a digital output word, said method comprising the steps of:

translating said input word to a range of digital output word;

determining a series of consecutively valued input words that translate to the same range of digital output word;

producing an error signal for said range of digital output word, said error signal determined by said series of consecutively valued input words and the relative location of input word within said series of input words; and adding said error signal to said range of digital output word to produce said digital output word.

9. The method of claim 8, said step of producing an error signal comprising:

producing a one data bit error signal for each digital output data word.

10. The method of claim 8, said step of producing an error signal comprising:

producing an accumulated error signal for each input word in said series of consecutively valued input words that translate to the same range of digital output word, said accumulated error signal equal to:

$$ACC_I = ACC_{I-1} + (I-1)/RPC$$

where:

RPC is said number of consecutive input words that translate to the same output word in each of said series of consecutively valued input words that translate to the same range of digital output word; and I is a location of said digital output word in said series; and if said accumulated error signal is greater than one, said error signal is equal to one and one is subtracted from said accumulated error signal, if said accumulated error signal is not greater than one, said error signal is equal to zero.

11. The method of claim 8, said translating step comprising:

using a monotonic function to translate said digital input word to said digital output word.

12. A method of translating an input word to an output word, said method comprising the steps of:

providing a memory lookup table, said memory lookup table comprised of a memory location for each possible input word in a series of consecutively valued binary input words, and an output word in each location, said output word determined by the steps of:

translating each said possible input word to an approximate output word corresponding to each said input word;

determining each series of consecutively valued input words that translate to the same approximate output word;

producing an error signal for each input word in each series of consecutively valued input words, said error signal determined by said series of consecutively valued input words and the relative location of said each consecutively valued input word within said series of consecutively valued input words;

adding said error signal for each consecutively valued input word to said approximate output word to produce said output word; and storing said output word in a memory location corresponding to each said input word;

addressing said memory lookup table using said input word; and reading said output word from said memory lookup table.

13. The method of claim 12, said step of producing an error signal comprising:

producing a one data bit error signal for each output data word.

14. The method of claim 12, said step of producing an error signal comprising:

producing an accumulated error signal for each input word in said series of consecutively valued input words that translate to the same approximate output word, said accumulated error signal equal to:

$$ACC_I = ACC_{I-1} + (I-1)/RPC$$

where:

RPC is said number of consecutive input words that translate to the same output word in each of said series of sequential input words that translate to the same approximate output word; and I is a location of said output word in said series; and if said accumulated error signal is greater than one, said error signal is equal to one and one is subtracted from said accumulated error signal, if said accumulated error signal is not greater than one, said error signal is equal to zero.

15. The method of claim 12, said translating step comprising:

using a monotonic function to translate said digital input word to said digital output word.

* * * * *

UNITED STATES PATENT AND TRADEMARK OFFICE
CERTIFICATE OF CORRECTION

PATENT : 6,052,491
DATED : April 18, 2000
INVENTOR(S) : Todd A. Clatanoff, Stephen W. Marshall, and Vishal Markandey It is certified that error appears in the above-identified patent and that said Letters Patent is hereby corrected as shown below:

Title Page, insert Item [60] under Related U.S. Application Data

--Provisional Application No. 60/010,645 Jan. 26, 1996.--

Signed and Sealed this

Twentieth Day of March, 2001

Attest:

NICHOLAS P. GODICI

*Attesting Officer*     *Acting Director of the United States Patent and Trademark Office*